United States Patent
Yang

(10) Patent No.: US 8,272,543 B2
(45) Date of Patent: Sep. 25, 2012

(54) COMBINATION OF FULL FLOW CAP VALVE AND NECK FINISH

(76) Inventor: Ue-Ming Yang, Chicago, IL (US)

(*) Notice: Subject to any disclaimer, the term of this patent is extended or adjusted under 35 U.S.C. 154(b) by 505 days.

(21) Appl. No.: 12/586,164

(22) Filed: Sep. 18, 2009

(65) Prior Publication Data

US 2011/0068134 A1     Mar. 24, 2011

(51) Int. Cl.
*B67D 3/00* (2006.01)
(52) U.S. Cl. ........ 222/520; 222/519; 222/549; 222/568; 222/569; 222/153.01; 222/153.06
(58) Field of Classification Search .......... 222/519–522, 222/525, 548–549, 562, 541.1, 566–569, 222/541.5, 153.06, 153.01
See application file for complete search history.

(56) References Cited

U.S. PATENT DOCUMENTS

| | | | | |
|---|---|---|---|---|
| 473,672 A * | 4/1892 | Schrader | ........................ | 222/520 |
| 2,403,299 A * | 7/1946 | Pickin | ........................... | 222/318 |
| 2,998,170 A * | 8/1961 | Manzione et al. | ............ | 222/520 |
| 3,149,755 A * | 9/1964 | Porter et al. | ..................... | 222/83 |
| 3,168,969 A * | 2/1965 | Krieps | ........................... | 222/520 |
| 3,175,741 A * | 3/1965 | Porter | ........................... | 222/521 |
| 3,240,404 A * | 3/1966 | Porter et al. | ................... | 222/521 |
| 3,343,731 A * | 9/1967 | Wonso | ........................... | 222/519 |
| 3,351,249 A * | 11/1967 | Stull | ............................. | 222/520 |
| 3,834,596 A * | 9/1974 | Brady et al. | ................... | 222/520 |
| 4,261,487 A * | 4/1981 | Seager | ........................... | 222/520 |
| 4,477,002 A * | 10/1984 | Stull | ............................. | 222/521 |
| 4,836,416 A * | 6/1989 | Shalgi et al. | ................... | 222/48 |
| 4,867,354 A * | 9/1989 | Schreiber | ....................... | 222/521 |
| 5,090,598 A * | 2/1992 | Stull | ............................. | 222/153.14 |
| 5,303,850 A * | 4/1994 | Connan | ..................... | 222/153.07 |
| D461,407 S * | 8/2002 | Barnes et al. | .................. | D9/453 |
| 6,871,764 B2 * | 3/2005 | Stoneberg et al. | ............ | 222/520 |
| 6,997,359 B2 * | 2/2006 | Boggs et al. | ................... | 222/520 |
| 2005/0045654 A1 * | 3/2005 | Kuge et al. | ..................... | 222/105 |

* cited by examiner

*Primary Examiner* — Frederick C. Nicolas

(57) ABSTRACT

Present invention provides a combination of one-piece full flow cap valve and improved neck finish of a fluid bottle. The one-piece full flow cap valve is constructed of a single injection molded piece, capable of discharging fluid at full flow capacity.

12 Claims, 4 Drawing Sheets

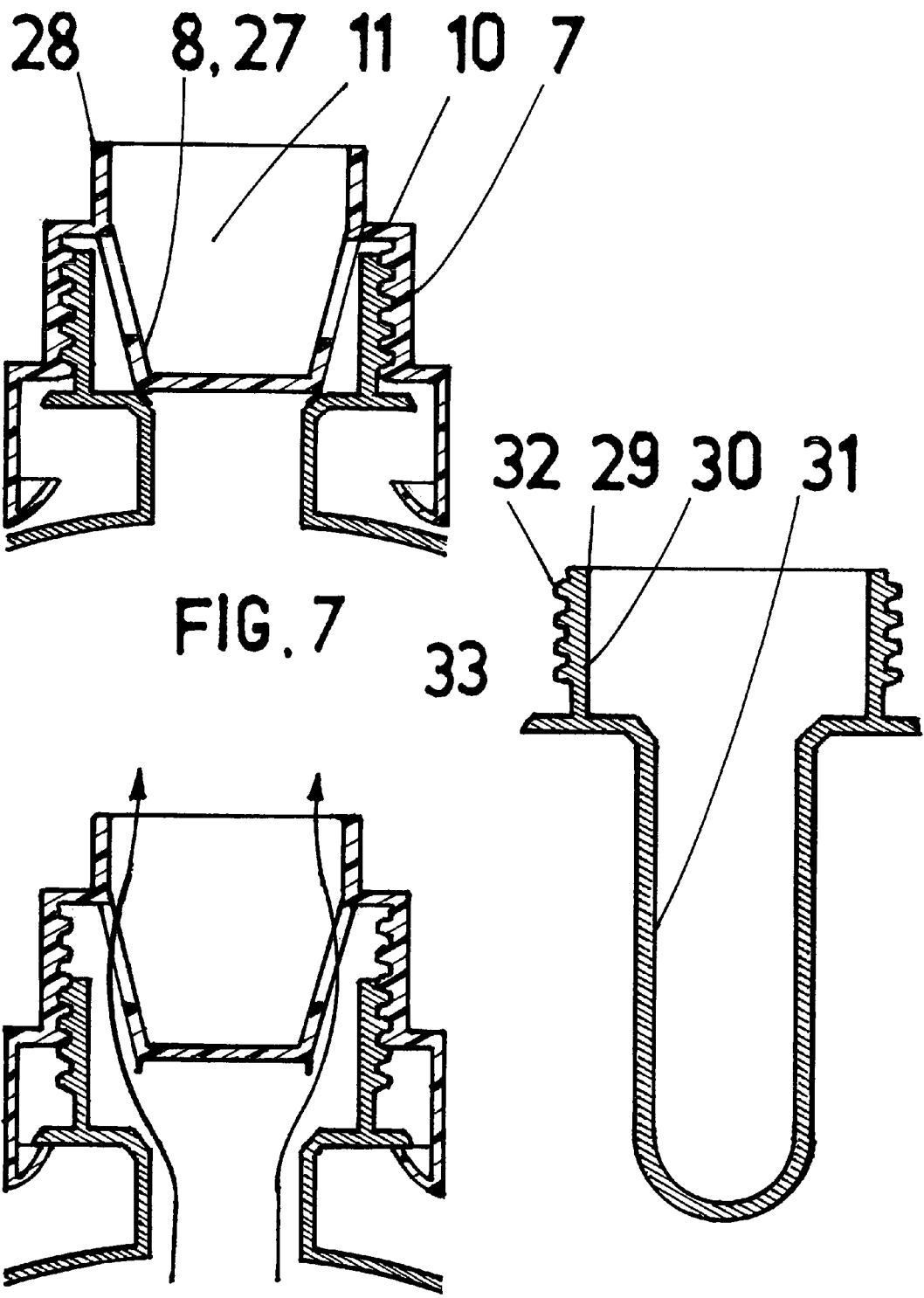

COMBINATION OF FULL FLOW CAP VALVE AND NECK FINISH

BACKGROUND OF THE INVENTION

Present invention relates to a full flow cap valve constructed of a single injection molded piece, which is adaptable to an improved neck finish of a fluid bottle.

Spillage has been a common problem during pouring motor oil from a motor oil bottle to a fill port of engine crankcase. This is due to the fact that oil begins to escape out of the outlet spout of bottle as bottle being tilted to a certain degree, in which, outlet spout has not yet been positioned immediately adjacent to the fill port. Numerous techniques have been proposed in prior art for solving spillage problem. However, no prior art has satisfactorily solved the problem and achieved commercialization, primarily due to the cost concern.

The motive of present invention is that a full flow cap valve of a single injection molded piece can be the most economical solution for solving spillage problem. During aligning outlet spout to fill port, cap valve is closed to seal the flow path through outlet spout. As bottle being inverted and outlet spout being aligned immediately adjacent to or submerged within fill port, cap valve is then opened to discharge oil directly into fill port at full flow capacity without a possibility of spillage. Full flow capacity of cap valve is defined as the maximum flow rate discharging through outlet spout when cap valve is not connected to outlet spout. However, all full flow cap valves of prior art are constructed of two or multiple injection molded pieces, which require extra assembling time and higher manufacturing costs.

Author of present invention has found that a one-piece cap valve can not possibly provide a flow area equivalent to the flow area of outlet spout when it is adapted to a conventional outlet spout. The conventional outlet spout or neck finish is typically in the form of a cylinder with a uniform bore size. Due to this fact, all one-piece cap valves of prior art can not discharge fluid at full flow capacity. Therefore, they are typically used for dispensing fluid at substantially reduced flow rate upon pressing or squeezing the fluid bottle.

Present invention takes a novel approach to convert the conventional neck finish to an improved neck finish constructed of two integrated cylinders, in which, an upper and larger cylinder is integrally connected and converged to a lower and smaller cylinder. The smaller bore size of lower cylinder defines the flow area of outlet spout or neck finish. A one-piece cap valve of present invention is then adapted to the upper cylinder of neck finish, capable of sealing the interior top rim of the lower cylinder of neck finish. All flow areas within cap valve are at least equivalent to the flow area of the lower cylinder of neck finish. As a result, cap valve of present invention is not only constructed of a single injection molded piece, but also capable of discharging fluid at full flow capacity. The improved neck finish of present invention is achieved by forming the identical neck finish at the injection molded parison, which is then undergoing a conventional blow molding process to form the body of fluid bottle.

OBJECTS OF THE INVENTION

An object of present invention is to provide a combination of cap valve and neck finish, so that cap valve is constructed of a single injection molded piece, capable of discharging fluid at full flow capacity.

Another object of present invention is to provide such a cap valve with a sealing means when it is in a closed position.

Another object of present invention is to provide such a cap valve with a captive means when it is in an open position.

Another object of present invention is to provide such a cap valve with a tamper indicating means.

BRIEF DESCRIPTION OF THE DRAWINGS

FIG. 7 is a schematic cross sectional view of a fourth preferred combination embodiments of cap valve and neck finish of present invention, in which, cap valve is in a closed position.

FIG. 8 is a schematic cross sectional view of a fourth preferred combination embodiments of cap valve and neck finish of present invention, in which, cap valve is in an open position.

FIG. 9 is a schematic cross sectional view of a parison, which can be blow molded to form the fluid bottle having the neck finish as shown in FIG. 1 through FIG. 8.

DETAILED DESCRIPTION OF THE DRAWINGS

Figure 1:
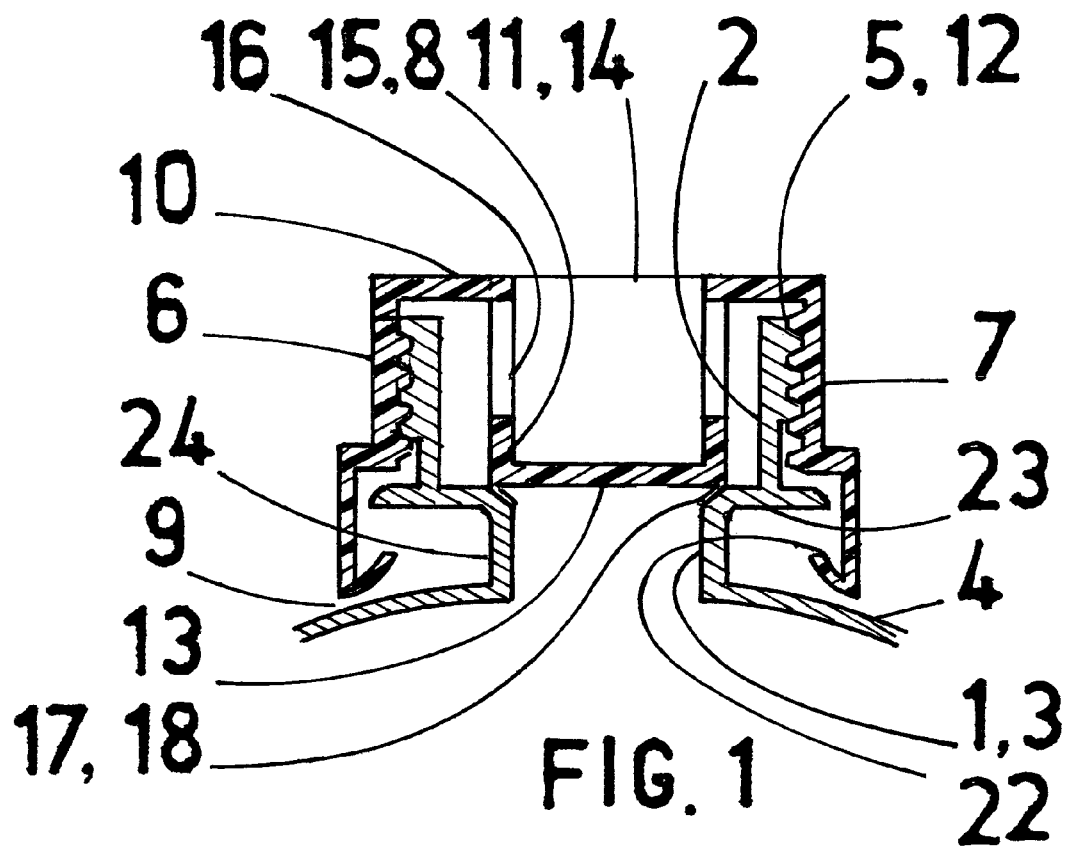
FIG. 1 is a schematic cross sectional view of a first preferred combination embodiments of cap valve and neck finish of present invention, in which, cap valve is in a closed position.
Figure 2:
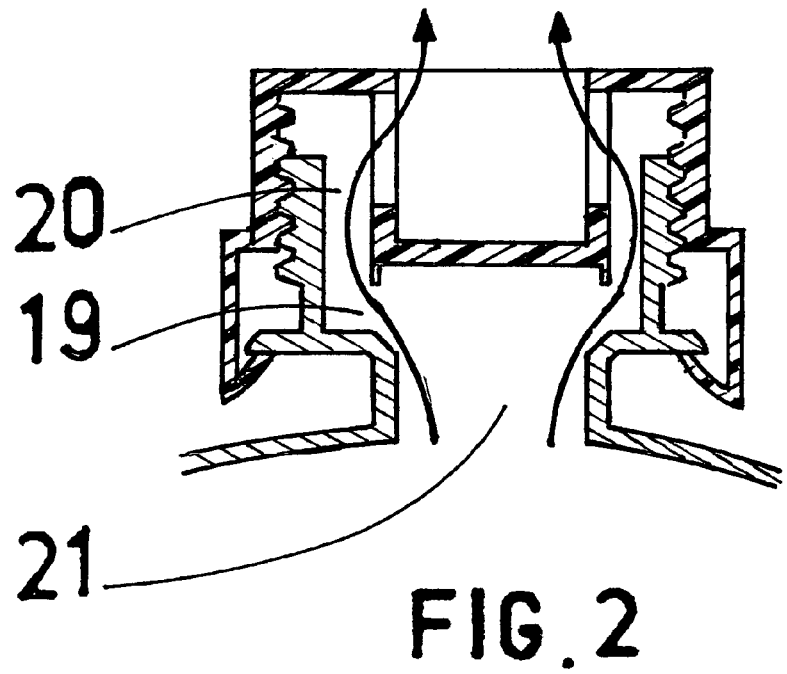
FIG. 2 is a schematic cross sectional view of a first preferred combination embodiments of cap valve and neck finish of present invention, in which, cap valve is in an open position.

FIG. 1 and FIG. 2 are schematic cross sectional views of the first preferred combination embodiments of cap valve and neck finish of present invention, in which, cap valve is in closed and open positions respectively. Neck finish 1 comprises of a first upper and larger cylinder 2 integrally connected and converged to a second lower and smaller cylinder 3, in which, lower end of second lower cylinder 3 is integrally connected to a fluid bottle body 4. First upper cylinder 2 is provided with external threads 5. Cap valve 6 is constructed of a single injection molded piece, which comprises of a first outer cylinder 7 and a second concentric inner cylinder 8. The first outer cylinder 7 has a bottom open end 9, a top enclosure wall 10 with a central opening 11, and internal threads 12 for engaging external threads 5 of first upper cylinder 2 of neck finish 1. The second inner cylinder 8 has a bottom enclosure wall 13, a top open end 14 integrally connected to top enclosure wall 10 of first outer cylinder 7 at peripheral of central opening 11, and a side cylindrical wall 15 with a plurality of openings 16.

Bottom enclosure wall 13 of cap valve 6 is provided with a circumferential bottom ring 17. The interior top rim of second lower cylinder 3 of neck finish 1 is provided with a circumferential tapered end 18. As a result, a sealing means is provided by a tight fit between ring 17 and tapered end 18 when cap valve 6 is at closed position as shown in FIG. 1. It is understood that sealing means of a bottle cap have been well known in prior art. Various sealing means of prior art can be adopted for sealing the interior top rim of second lower cylinder 3 of neck finish 1. The above described sealing means is not intended for limiting the scope of present invention. Variations and modifications to the above described sealing means are allowed and considered with the scope of present invention.

When cap valve 6 is at open position as shown in FIG. 2, bottom enclosure wall 13 of cap valve 6 is separated from interior top rim of second lower cylinder 3 of neck finish 1 by a vertical annular clearance 19. Cap valve 6 is then capable of discharging fluid through a flow path consisting of vertical annular clearance 19, a horizontal annular clearance 20 between first upper cylinder 2 of neck finish 1 and second inner cylinder 8 of cap valve 6, openings 16 of second inner cylinder 8 of cap valve 6, and central opening 11 of top enclosure wall 10 of cap valve 6. Each of vertical annular clearance 19, horizontal annular clearance 20, openings 16 and central opening 11 provides a flow area at least equivalent to flow area 21 of second lower cylinder 3 of neck finish 1. As a result, cap valve is capable of discharging fluid at full flow capacity. Full flow capacity is defined as the maximum flow rate discharging through flow area 21 of second lower cylinder 3 of neck finish 1 without cap valve 6 being connected to neck finish 1.

Cap valve 6 is provided with a captive means so that it can not be possibly separated from neck finish 1 at open position during normal operation. Captive means has been well known in prior art. Generally, it provides a retaining element that has a form and resilient characteristic capable of "passing over" and engaging beneath a shoulder provided at the neck finish of bottle during bottle capping process. The retaining element is typically in the form of a circumferentially continuous or segmented bead, ratchet teeth, folding tabs, or other similar stop elements.

Cap valve 6 is also provided with a tamper indicating means. The preferred tamper indicating means is to provide the retaining element of the captive means with sufficient strength and rigidity so that it is only possible to disengage retaining element from neck finish (i.e. to separate cap valve 6 from neck finish 1) by plastically deforming the retaining element or cap valve 6 with an excessive opening torque/force. This causes the shape of cap valve 6 to be plastically deformed, and thus provides evidence that cap valve 6 has been tampered. The alternative tamper indicating means is to connect the retaining element to the bottom section of first outer cylinder 7 of cap valve 6 with a scored line or a plurality of segmented frangible connectors. The scored line or frangible connectors can not be possibly broken unless cap valve 6 is applied by an opening torque/force, which is substantially larger than the maximum opening torque/force possibly exerted by user during normal operation. This is to prevent user from accidentally breaking the scored line or frangible connectors (i.e. separating cap valve 6 from neck finish 1) during normal operation. However, if some one tends to tamper cap valve 6 with excessive opening torque/force, scored line or frangible connectors will be broken, and the retaining element will be retained to neck finish 1 to provide evidence that cap valve 6 has been tampered. In this case, the retaining element must have sufficient strength and rigidity so that the retaining element can not be possibly disengaged from neck finish 1 before the scored line or frangible connectors being broken.

In present invention, it is necessary to provide the retaining element of captive means with sufficient strength and rigidity. However, it is well known in prior art that the retaining element with higher strength and rigidity is more difficult to be stripped off form the core mold after the injection molding process. In fact, the retaining element with higher strength and rigidity can be likely deformed during stripping process. Various techniques have been developed in prior art to form an "as-molded" retaining element, or to post-form the retaining element after molding process. Various stripping techniques and core mold improvements have also been developed in prior art for an easy removal of core mold(s) without plastically deforming the retaining element. It is not the intent of present invention to specify a particular form of retaining element of captive means, or a particular process for making it. It is also not the intent of present invention to provide detailed description of retaining element to limit the scope of present invention. The following described retaining element of captive means is intended for illustration purpose only. Variations and modifications are allowed and considered within the scope of present invention. In FIG. 1 and FIG. 2, first outer cylinder 7 is provided with a plurality of circumferentially segmented upward folding tabs 22 at the bottom interior section of first outer cylinder 7. During capping process, folding tabs 22 flexibly pass over and engage beneath a shoulder 23 of neck finish 1. When cap valve 6 is rotated from closed position to open position, folding tabs 22 travel through the recessed area 24 to engage beneath shoulder 23, in which, folding tabs 22 serve as ratchets to restrict upward movement of cap valve 6. As a result, a stop limit of the rotation of cap valve 6 in opening direction is provided by folding tabs 22, which prevents cap valve 6 from being separated from neck finish 1. Folding tabs 22 can be connected to the first outer cylinder 7 without or with a scored line or frangible connectors (not shown) in accordance with the previously described preferred or alternative tamper indicating means respectively.

Finally, it is necessary to provide the central opening 11 of cap valve 6 with a tamper indicating enclosure. Tamper indicating enclosures have been well known in prior art, which include a conventional screw on cap, "tear-off tab" or "shrink wrap". It is not the intent of present invention to specify a particular tamper indicating closure, nor provide a detailed description for the tamper indicating enclosure for covering the central opening 11. Any tamper indicating enclosure of prior art shall be allowed and considered within the scope of present invention.

Figure 3:
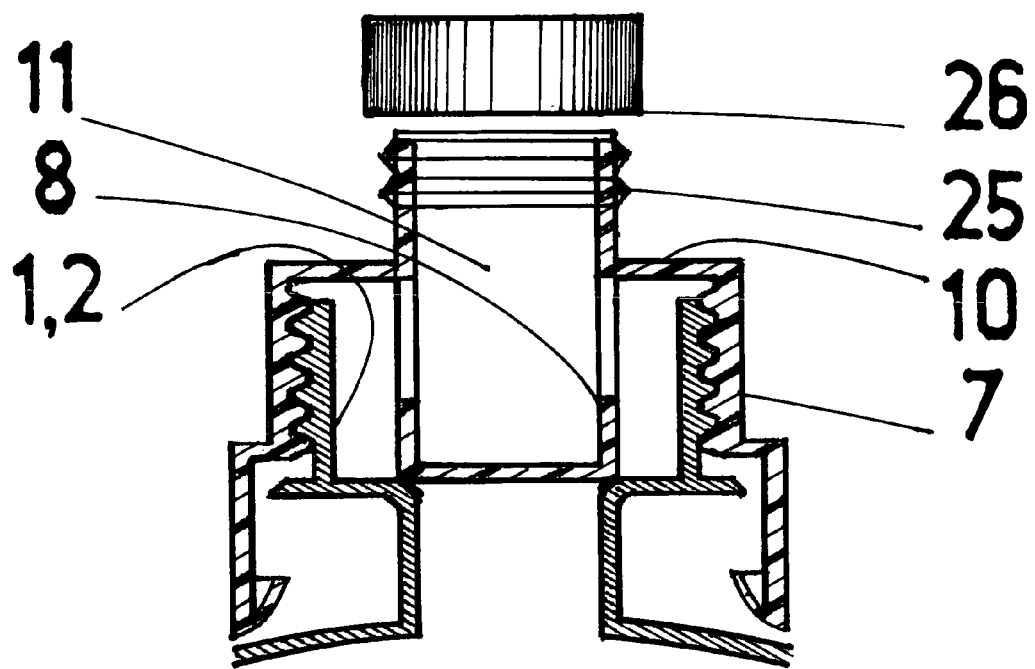
FIG. 3 is a schematic cross sectional view of a second preferred combination embodiments of cap valve and neck finish of present invention, in which, cap valve is in a closed position.
Figure 4:
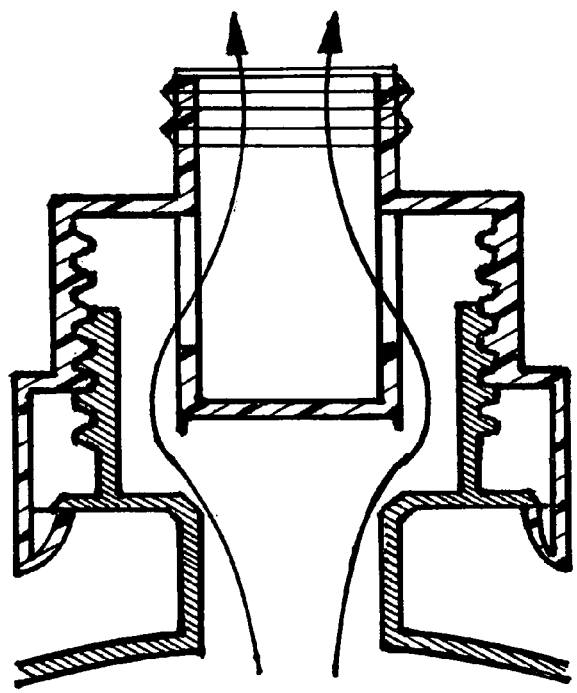
FIG. 4 is a schematic cross sectional view of a second preferred combination embodiments of cap valve and neck finish of present invention, in which, cap valve is in an open position.

FIG. 3 and FIG. 4 are schematic cross sectional views of the second preferred combination embodiments of cap valve and neck finish of present invention, in which, cap valve is in a closed and open positions respectively. The second preferred combination embodiments are identical to the first preferred combination embodiments with the following exceptions: First, a third upper cylinder 25 is provided, which comprises of a top open end, a bottom open end integrally connected to top enclosure wall 10 of first outer cylinder 7 at peripheral of central opening 11 of first outer cylinder 7, and a side cylindrical wall with external threads. In fact, the third upper cylinder 25 and the second lower cylinder 8 can be integrally formed as a single cylinder during injection molding process. Second, a screw on cap 26 with a conventional tamper indicating means is adapted to the third upper cylinder 25. Screw on cap 26 is preferably engaged with third upper cylinder 25 by a right hand thread engagement. The first outer cylinder 7 of cap valve 6 is preferably engaged with first upper cylinder 2 of neck finish 1 by a left hand thread engagement. As a result, user can open the screw on cap 26 by applying a torque force in closing direction of first upper cylinder 7 of cap valve 6. A marking (not shown) to show the actual opening direction of cap valve 6 can be optionally provided on the exterior surface of first outer cylinder 7. In FIG. 3 and FIG. 4, screw on cap 26 serves as a tamper indicating enclosure for covering central opening 11 of cap valve 6. It is understood that a different tamper indicating enclosure other than screw on cap 26 can be used for covering central opening 11 without exceeding the scope of present invention.

Figure 5:
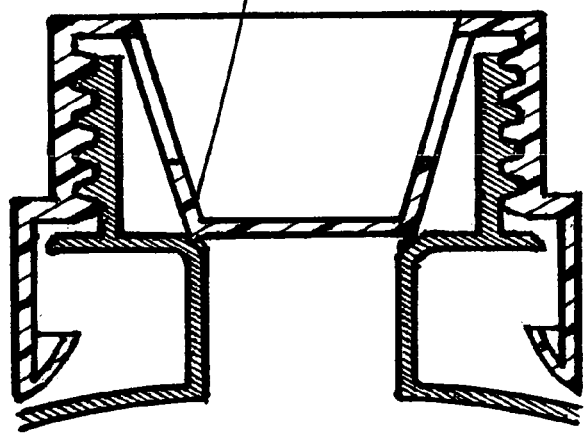
FIG. 5 is a schematic cross sectional view of a third preferred combination embodiments of cap valve and neck finish of present invention, in which, cap valve is in a closed position.
Figure 6:
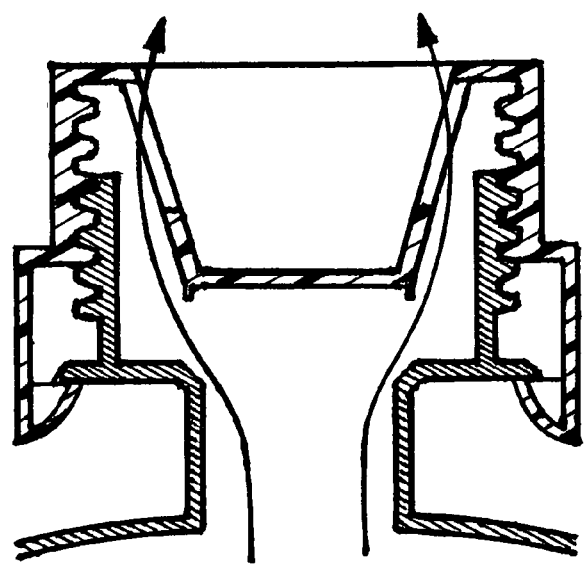
FIG. 6 is a schematic cross sectional view of a third preferred combination embodiments of cap valve and neck finish of present invention, in which, cap valve is in an open position.

FIG. 5 and FIG. 6 are schematic cross sectional views of the third preferred combination embodiments of cap valve and neck finish of present invention, in which, cap valve is in a closed and open positions respectively. The third preferred combination embodiments are identical to the first preferred combination embodiments with an exception. The exception is that second inner cylinder 8 has an inclined side cylindrical wall 27 so that second inner cylinder 8 is in a reversed conical shape.

FIG. 7 and FIG. 8 are schematic cross sectional views of the fourth preferred combination embodiments of cap valve and neck finish of present invention, in which, cap valve is in a closed and open positions respectively. The fourth preferred combination embodiments are identical to the third preferred combination embodiments with one exception. The exception is that a third upper cylinder 28 is provided, which comprises of a top open end, and a bottom open end integrally connected to top enclosure wall 10 of first outer cylinder 7 at peripheral of central opening 11 of first outer cylinder 7. In fact, the third upper cylinder 28 and the second lower cylinder 8 can be integrally formed during injection molding process. No tamper indicating enclosure is shown in FIG. 7 and FIG. 8 for covering central opening 11. It is understood that various tamper indicating enclosures can be used for covering central opening 11 without exceeding the scope of present invention.

FIG. 9 is a schematic cross sectional view of a parison, which can be blow molded to form the fluid bottle having the neck finish 1 as shown in FIG. 1 through FIG. 8. The injection molded parison 29 comprises a larger open top tubular section 30 with a bore size equal to bore size of first upper cylinder 2 of neck finish 1, and a smaller closed bottom tubular section 31 with a bore size equal to bore size of second lower cylinder 3 of neck finish 1. The top tubular section 30 is provided with external threads 32 identical to external threads 5 of neck finish 1. The interior top rim of the bottom tubular section is provided with a tapered end 33 identical to tapered end 18 at the interior top rim of second lower cylinder 3 of neck finish 1.

What is claimed is:

1. A neck finish and a one piece full flow cap valve of a fluid bottle, in which, said neck finish comprises of:
  a first upper and larger cylinder integrally connected and converged to a second lower and smaller cylinder, in which, said first upper cylinder is provided with external threads, and said second lower cylinder is integrally connected to a body of said fluid bottle; and
  said cap valve comprises of:
  a first outer cylinder having a bottom open end, a top enclosure wall with a central opening, and a side cylindrical wall with internal threads for engaging said external threads of said first upper cylinder of said neck finish, and
  a second concentric inner cylinder having a bottom enclosure wall, a top open end integrally connected to said top enclosure wall of said first outer cylinder at peripheral of said central opening of said first outer cylinder, and a side cylindrical wall with a plurality of openings;

wherein:
  said bottom enclosure wall of said cap valve has a sealing means for sealing an interior top rim of said second lower cylinder of said neck finish when said cap valve is rotated to a closed position; and
  said bottom enclosure wall of said cap valve is departed from said interior top rim of said second lower cylinder of said neck finish when said cap valve is rotated to an open position, in which, said cap valve is capable of discharging fluid through a flow path consisting of a vertical annular clearance between said interior top rim of said second lower cylinder of said neck finish and said bottom enclosure wall of said cap valve, a horizontal annular clearance between said first upper cylinder of said neck finish and said second inner cylinder of said cap valve, said openings in said side cylindrical wall of said second inner cylinder of said cap valve, and said central opening of said top enclosure wall of said cap valve; and
  each of said vertical annular clearance, said horizontal annular clearance, said openings in said cylindrical wall of said second inner cylinder, and said central opening of said top enclosure wall has a flow area substantially equivalent to a flow area of said second lower cylinder of said neck finish when said cap valve is rotated to said open position; and
  said cap valve and said neck finish have captive means for providing a stop limit of the rotation of said cap valve in opening direction, and thus prevents said cap valve from being separated from said neck finish at said open position.

2. The cap valve according to claim 1, in which, said side cylindrical wall of said second inner cylinder is inclined so that said second inner cylinder is in a reversed conical shape.

3. The cap valve according to claim 1, in which, said sealing means is provided by a tight fit between a circumferential bottom ring at said bottom enclosure wall of said second inner cylinder, and a circumferentially tapered end at said interior top rim of said second lower cylinder of said neck finish.

4. The cap valve according to claim 1, in which, said captive means is provided by a retaining element located at a bottom interior section of said first outer cylinder of said cap valve, capable of engaging beneath a shoulder of said neck finish when said cap valve is at said open position;
  and said retaining element has sufficient strength and rigidity so that the only way to separate said cap valve from said neck finish at said open position is to plastically deform said cap valve by a significantly large opening torque force.

5. The cap valve according to claim 1, in which, said captive means is provided by a retaining element detachably connected to a bottom section of said first outer cylinder of said cap valve by a connecting means; and said retaining element is capable of engaging beneath a shoulder of said neck finish when said cap valve is at said open position; and said retaining element and said connecting means have sufficient strength and rigidity so that a maximum opening torque force possibly exerted by user during normal operation of said cap valve can not possibly break said connecting means; and the opening torque force for disengaging said retaining element from said neck finish is substantially higher than the opening torque force for breaking said connecting means and separating said retaining element from said first outer cylinder of said cap valve.

6. A neck finish and a one piece full flow cap valve of a fluid bottle, in which, said neck finish comprises of:
- a first upper and larger cylinder integrally connected and converged to a second lower and smaller cylinder, in which, said first upper cylinder is provided with external threads, and said second lower cylinder is integrally connected to a body of said fluid bottle; and said cap valve comprises of:
- a first outer cylinder having a bottom open end, a top enclosure wall with a central opening, and a side cylindrical wall with internal threads for engaging said external threads of said first upper cylinder of said neck finish,
- a second concentric inner cylinder having a bottom enclosure wall, a top open end integrally connected to said top enclosure wall of said first outer cylinder at peripheral of said central opening of said first outer cylinder, and a side cylindrical wall with a plurality of openings, and
- a third upper cylinder having a top open end, and a bottom open end integrally connected to said top enclosure wall of said first outer cylinder at peripheral of said central opening of said first outer cylinder;

wherein:
said bottom enclosure wall of said cap valve has a sealing means for sealing an interior top rim of said second lower cylinder of said neck finish when said cap valve is rotated to a closed position; and
said bottom enclosure wall of said cap valve is departed from said interior top rim of said second lower cylinder of said neck finish when said cap valve is rotated to an open position, in which, said cap valve is capable of discharging fluid through a flow path consisting of a vertical annular clearance between said interior top rim of said second lower cylinder of said neck finish and said bottom enclosure wall of said cap valve, a horizontal annular clearance between said first upper cylinder of said neck finish and said second inner cylinder of said cap valve, said openings in said side cylindrical wall of said second inner cylinder of said cap valve, said central opening of said top enclosure wall of said first outer cylinder of said cap valve, and a bore of said third upper cylinder of said cap valve; and
each of said vertical annular clearance, said horizontal annular clearance, said openings in said cylindrical wall of said second inner cylinder, said central opening of said top enclosure wall, and said bore of said third upper cylinder has a flow area substantially equivalent to a flow area of said second lower cylinder of said neck finish, when said cap valve is rotated to said open position; and
said cap valve and said neck finish have captive means for providing a stop limit of the rotation of said cap valve in opening direction, and thus prevents said cap valve from being separated from said neck finish at said open position.

7. The cap valve according to claim 6, in which, said side cylindrical wall of said second inner cylinder is inclined so that said second inner cylinder is in a reversed conical shape.

8. The cap valve according to claim 6, in which, said sealing means is provided by a tight fit between a circumferential bottom ring at said bottom enclosure wall of said second inner cylinder, and a circumferentially tapered end at said interior top rim of said second lower cylinder of said neck finish.

9. The cap valve according to claim 6, in which, said captive means is provided by a retaining element located at a bottom interior section of said first outer cylinder of said cap valve, capable of engaging beneath a shoulder of said neck finish when said cap valve is at said open position; and said retaining element has sufficient strength and rigidity so that the only way to separate said cap valve from said neck finish at said open position is to plastically deform said cap valve by a significantly large opening torque force.

10. The cap valve according to claim 6, in which, said captive means is provided by a retaining element detachably connected to a bottom section of said first outer cylinder of said cap valve by a connecting means; and said retaining element is capable of engaging beneath a shoulder of said neck finish when said cap valve is at said open position; and said retaining element and said connecting means have sufficient strength and rigidity so that a maximum opening torque force possibly exerted by user during normal operation of said cap valve can not possibly break said connecting means; and the opening torque force for disengaging said retaining element from said neck finish is substantially higher than the opening torque force for breaking said connecting means and separating said retaining element from said first outer cylinder of said cap valve.

11. The cap valve according to claim 6, in which, a tamper indicating enclosure for covering said top open end of said third upper cylinder is provided by a screw on cap having a tamper indicating means capable of providing evidence if said cap valve has been tampered.

12. The neck finish according to claim 1 or 6, in which, said neck finish is made of an injection molded parison comprising of a larger open top tubular section with a bore size equal to a bore size of said first upper cylinder of said neck finish, and a smaller closed bottom tubular section with a bore size equal to a bore size of said second lower cylinder of said neck finish.

* * * * *